(12) United States Patent
Kuroki et al.

(10) Patent No.: US 7,245,457 B2
(45) Date of Patent: Jul. 17, 2007

(54) MAGNETIC DISK DRIVE USING FEMTO SLIDER AND HAVING PREDETERMINED LINEAR VELOCITY AND GRAM LOAD CONFIGURATION

(75) Inventors: Kenji Kuroki, Kanagawa (JP); Taichi Nakamura, Kanagawa (JP); Akira Tokizono, Kanagawa (JP); Akihiro Sera, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 543 days.

(21) Appl. No.: 10/902,821

(22) Filed: Jul. 30, 2004

(65) Prior Publication Data
US 2005/0275971 A1    Dec. 15, 2005

(30) Foreign Application Priority Data
Jun. 11, 2004    (JP)    ............... 2004-173550

(51) Int. Cl.
G11B 5/48    (2006.01)
G11B 17/02    (2006.01)
G11B 5/60    (2006.01)
G11B 5/54    (2006.01)

(52) U.S. Cl. ............... 360/244.2; 360/99.08; 360/235.5

(58) Field of Classification Search ............ 360/244.2, 360/99.08, 235.5, 234.6
See application file for complete search history.

(56) References Cited

U.S. PATENT DOCUMENTS

2003/0218832 A1    11/2003   Tsuchiyama et al.
2004/0150913 A1*    8/2004   Yoshida et al. .......... 360/235.5

FOREIGN PATENT DOCUMENTS

JP    11-306703 A    11/1999
JP    2002-133631 A    5/2002

\* cited by examiner

*Primary Examiner*—Craig A. Renner
(74) *Attorney, Agent, or Firm*—Townsend and Townsend and Crew LLP; Duke Amaniampong

(57) ABSTRACT

A magnetic disk drive includes a magnetic disk and a femto slider. The magnetic disk has a minimum track linear velocity of 1 to 5 m/s. In one embodiment, the magnetic disk drive includes a negative pressure type femto slider and adopts a load/unload method. A gram load "GL" of a head suspension assembly HSA is set at a value exceeding about 3 mN and smaller than about 15 mN and a pitch static attitude "PSA" (deg) and pitch stiffness "Kp" (Nm/deg) satisfy the expression ((PSA×Kp)/GL)<0.25 mm. As a result, it is possible to prevent the femto slider from assuming a meta-stable flying high state referred to as a bi-stable height. Further, by setting the pitch static attitude "PSA" at a value of larger than 0 deg, it is possible to prevent the slider from assuming a state of meta-stable contact with the magnetic disk surface referred to as semi-stable drag.

19 Claims, 9 Drawing Sheets

(A)

(A)

(B)

(A)

(B)

MAGNETIC DISK DRIVE USING FEMTO SLIDER AND HAVING PREDETERMINED LINEAR VELOCITY AND GRAM LOAD CONFIGURATION

BACKGROUND OF THE INVENTION

The present invention relates to a technique of applying a femto slider to a magnetic disk drive with a magnetic disk mounted thereon, the magnetic disk including a track of a low linear velocity due to a low rotational velocity or a small radius up to an innermost radius track.

A slider used in a magnetic disk drive shows a continuous downsizing tendency because of a great advantage resulting from the reduction of size. As to an external size of the slider, a standard is defined by IDEMA (International Disk Drive Equipment and Materials Association). According to the standard, the size of a "mini slider" of 4.06 mm×3.2 mm×0.86 mm is designated 100% size and is used as a reference value; likewise, in order of size, there are defined "micro slider" (70%), "nano slider" (50%), "pico slider" (30%), and "femto slider" (20%).

The femto slider is the smallest in size among the sliders available at present. Its external size is 0.85 mm×0.7 mm×0.23 mm. Reducing the external size of a slider is advantageous in point of cost because the number of sliders capable of being taken out from a single wafer increases, and it is also suitable for the reduction in size of a magnetic disk drive. In a magnetic disk drive of a load/unload type, a slider sometimes strikes against the surface of a magnetic disk at the time of loading thereof from a ramp. Therefore, in a magnetic disk drive of a load/unload type, in order to ensure safety of recorded data, a non-recording area is usually provided outside an outermost radius track on a magnetic disk. Since the femto slider is small-sized, it is advantageous in that the width of the non-recording area can be decreased and the recording capacity of the magnetic disk can be increased thereby. In this case, a magnetic disk having a smaller diameter is more advantageous.

Since the longitudinal size of the femto slider is about 70% of that of the pico slider, there accrues an advantage such that the flying height compliance performance for disk curvature formed in the track circumference direction on a rotating magnetic disk surface is superior and a flying height of the slider becomes stable. When the femto slider and the pico slider are allowed to fly over the same disk and their amounts of change in flying height are compared with each other, the amount of change in flying height of the femto slider based on an ideal flying height over a magnetic disk, i.e., flying sensitivity, is about half of that of the pico slider.

In the case of the femto slider, the area of an air bearing surface (ABS) formed on its side opposed to the magnetic disk is about half of that of the pico slider. The femto slider has heretofore been used in a 2.5-inch type magnetic disk drive having a nominal magnetic disk diameter of 2.5 inches (1 inch=25.4 mm), but the application thereof to a smaller-size magnetic disk drive such as one having a nominal magnetic disk diameter of 1 inch or less is also very advantageous because of such advantages as the reduction in width of the non-recording area and in size.

In a small-sized magnetic disk drive having a small diameter of a spindle bearing and a small radius up to an innermost radius track, there sometimes occurs a case where, unless the rotational speed is increased, there is not obtained a sufficiently high flow velocity of an air current for forming an air bearing in the innermost radius track disposed on the innermost side. A solution to this problem is known wherein the rotational speed of a spindle motor is increased to increase the linear velocity of the innermost radius track. But this method is restricted by such problems as an increase in power consumption and the need of a high voltage for driving the spindle motor. Thus, for adopting the femto slider in a small-sized magnetic disk drive, it is necessary to solve various problems caused by a decrease in the ABS area of the slider and a decrease in the flow velocity of the air current.

In US 2003-0218832 describes an example in which a femto slider is applied to a 2.5-inch type magnetic disk drive and a suspension load is set at 29.4 mN (see paragraph [0096] and FIG. 8). On page 53 of Structure and Application of Hard Disk Drive, CQ Publishing Co., Ltd., published Jul. 1, 2003, there is a description to the effect that a femto slider is used at a spring load of 1 to 2 gf (9.8 mN to 19.6 mN).

BRIEF SUMMARY OF THE INVENTION

The slider is required to have such a kinetic performance as to perform stable pivot or gimbal motion against an air current with a dimple contact point (hereinafter referred to as DCP) formed on a load beam or a flexure as a support point. The structure of ABS, stiffness in pitching and rolling directions of a flexure, a gram load of a load beam, a pitch static attitude and a roll static attitude of the slider, a pressure distribution of ABS induced by an air current, and a skew angle of the slider relative to a track, are related to the kinetic performance of the slider. However, if an attempt is made to apply a femto slider to a magnetic disk low in flow velocity of an air current, there arises a new problem in ensuring the kinetic performance of the slider.

A magnetic disk drive is known in which a minimum linear velocity of a track, which is determined by both rotational speed and radius up to the innermost radius track on a magnetic disk, is 1 m/s to 5 m/s in the innermost radius track. For example, in the case where a nominal diameter of a magnetic disk is 1 inch and a rotational speed thereof is 9,000 rpm, a linear velocity of the innermost radius track becomes 5 m/s or so. A magnetic disk drive having a minimum linear velocity of a track of 1 m/s to 5 m/s and with a femto slider applied thereto will hereinafter be referred to as a femto low linear velocity drive. In the femto low linear velocity drive, the flow velocity of an air current on the surface of a magnetic disk is low and the area of ABS of a slider is small. Therefore, for preventing impairment of its flying performance, it is necessary to decrease a gram load of a load beam.

However, if a gram load of a load beam is decreased, there arises new problems which have so far not become a serious issue in case of applying a femto slider to a magnetic disk drive of a high linear velocity as in the conventional magnetic disk drive or in case of applying a pico slider to a magnetic disk drive of a low linear velocity. The new problems involve a problem that the impact resistance in operation or non-operation becomes lower or the amount of change in flying height caused by a change in atmospheric pressure must be taken into account strictly, a problem that there arises such a meta-stable flying height of the slider larger than the normal flying height as is called bi-stable height, and a problem that there arises such a state of a meta-stable contact of the slider with the surface of a magnetic disk as is called semi-stable drag.

As noted above, many advantages accrue in adopting a femto slider in a magnetic disk drive. However, in the case of a magnetic disk drive including a track of a linear velocity as low as 1 m/s to 5 m/s, it is necessary to ensure a high impact resistance and solve such problems as bi-stable height and semi-stable drag. Accordingly, it is an object of the present invention to solve these problems and provide a magnetic disk drive provided with a magnetic disk having a lowest track linear velocity of 1 m/s to 5 m/s, also provided with a femto slider and capable of exhibiting a superior performance.

Embodiments the present invention adopt a structure peculiar to a head suspension assembly (hereinafter referred to as "HSA") for enabling the implementation of a femto low linear velocity drive. For accomplishing a femto low linear velocity drive, the present invention takes note of a gram load "GL" (Pushing Load) of a load beam, as well as "PSA" (Pitch Static Attitude) and pitch stiffness "Kp" of a flexure as another constituent of HSA. In the case where a magnetic disk drive according to the present invention uses a negative pressure type femto slider and adopts a load/unload method, there is provided a structure of HSA that can cope with bi-stable height and semi-stable drag which have not occurred in the conventional magnetic disk drive.

By the term "bi-stable height" it is meant that two modes, one being a flying position of a predetermined normal height and a flying position ("fly-high" hereinafter) usually around four to eight times, or several ten times as the case may be, higher than the flying position of the predetermined normal height, are existent as flying positions which permit a slider to fly at a stable height over the surface of a magnetic disk. When the slider flies at the fly-high position out of such two stable flying positions, the spacing between the head and the recording surface of the magnetic disk becomes too wide and read of servo data and read or write of user data become unstable, giving rise to a state in which it is impossible to read servo data, or read or write of user data becomes erroneous although it is possible to read servo data.

By the "stable flying position" is not meant a position in which the slider flies at a completely constant flying height, but is meant a position in which the slider flies while performing a gimbal motion or undergoing small changes in a certain range due to disk height, angle, and curvature. By the "semi-stable drag" is meant a state in which a leading edge (air inlet end) of the slider is closer to the magnetic disk surface than a trailing edge (air outlet end) thereof and comes into contact with the magnetic disk surface continuously or frequently repeats contact and non-contact with respect to the magnetic disk surface.

According to an aspect of the present invention, a magnetic disk drive comprises a magnetic disk having a track whose linear velocity is in the range of exceeding about 1 m/s and lower than about 5 m/s at a rated rotational speed, a femto slider having a head which makes access to the magnetic disk, and a head suspension assembly which supports the femto slider, wherein a gram load of the head suspension assembly exceeds about 3 mN and is lower than about 15 mN.

In a femto low linear velocity drive, if a gram load of HSA is set at a value exceeding about 3 mN and smaller than about 15 mN, it is possible to solve the problems concerned with impact resistance in operation and the amount of change in flying height of a slider caused by a change of atmospheric pressure. If the pitch stiffness is set at about 0.2 Nm/deg or higher, it is possible to avoid plastic deformation of a flexure and ensure a sufficient impact resistance during non-operation. If the pitch stiffness is set at about 2 Nm/deg or less, it is possible to attain a stable flying characteristic under a stable gimbal motion. In the case where the magnetic disk drive has a negative pressure type femto slider and adopts a load/unload method, the occurrence of bi-stable height can be suppressed by constructing HSA so as to satisfy the expression of $((PSA \times Kp)/GL) < 0.25$ mm.

Further, if "PSA" is set at a value exceeding 0 deg and smaller than about 3 deg, it is possible to also suppress the occurrence of semi-stable drag. Since the femto slider is small in external size and permits a decrease of the area of a non-recording area, its application to a small-sized magnetic disk drive is very advantageous. Thus, the femto low linear velocity drive is suitable for implementing a small-sized magnetic disk drive having a nominal diameter of a magnetic disk of not larger than about 1 inch, such as 1 inch or 0.8 inch. However, its application to a magnetic disk drive having a nominal magnetic disk diameter of larger than about 1 inch is also included in the scope of the present invention.

According to the present invention, a magnetic disk drive making the most of a femto slider could be provided by adopting the femto slider in a magnetic disk drive which includes a magnetic disk having a lowest linear velocity of a track of exceeding about 1 m/s and smaller than about 5 m/s.

DETAILED DESCRIPTION OF THE INVENTION

Figure 1:
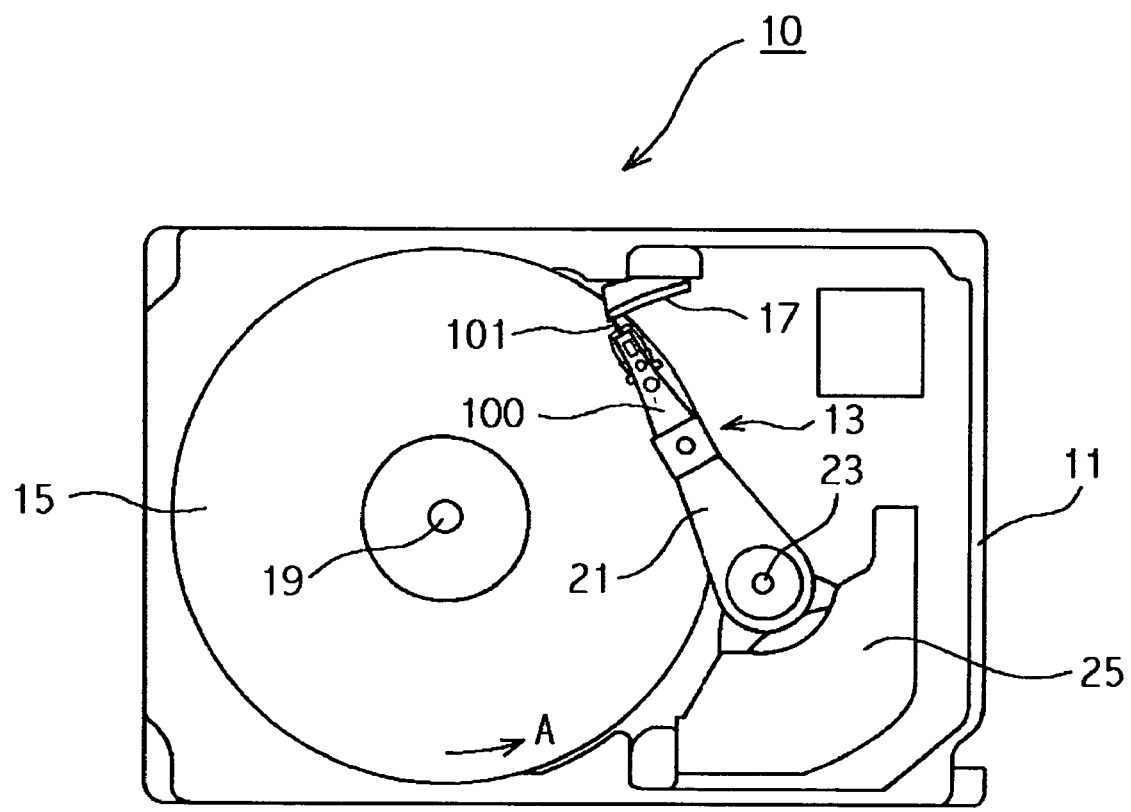
FIG. 1 is a plan view of a magnetic disk drive according to an embodiment of the present invention.

FIG. 1 is a plan view showing a schematic construction of a magnetic disk drive 10 which is an example of a femto low linear velocity drive according to an embodiment of the present invention. A base 11 not only forms a clean, hermetically sealed space together with a top cover (not shown) which is bonded to an upper surface of the base, but also provides a mounting surface for mounting thereto of an actuator head suspension assembly ("AHSA" hereinafter) 13, a magnetic disk 15, a ramp 17 and a voice coil magnetic circuit 25. The single magnetic disk 15 or a stack of plural magnetic disks 15 are mounted to a spindle hub (not shown) so as to be rotatable about a spindle shaft 19. A magnetic layer as a recording surface is formed on a surface and a backside of each magnetic disk 15. A thin protective layer is formed on the surface of the magnetic layer.

A spindle motor (not shown) disposed below the magnetic disk 15 causes each magnetic disk 15 to rotate at a high speed, but the linear velocity in an innermost radius track is in the range of exceeding about 1 m/s and lower than about 5 m/s. Among the tracks on the magnetic disk 15, the innermost radius track is the lowest in linear velocity. The linear velocity of a track indicates a velocity in the circumferential direction of each track on a rotating magnetic disk. On the magnetic disk 15, a large number of tracks are defined by servo information concentrically from the inside toward the outside, and the closer to the outside diameter, the higher the linear velocity of a track.

The AHSA 13 is composed of an HSA 100 and an actuator assembly 21. The HSA 100 includes a femto slider, a flexure, and a load beam. The structure of the HSA 100 will be described later with reference to FIGS. 2 to 4. The actuator assembly 21 holds a voice coil (not shown) and is driven by a voice coil motor ("VCM" hereinafter) which is composed of a voice coil and a voice coil magnetic circuit. With the voice coil motor, the actuator assembly 21 moves pivotally about a pivot shaft 23 to position a head on a slider to a predetermined track.

A merge lip 101 is formed at a distal end of the HSA 100. Before stopping rotation of the magnetic disk 15, the AHSA 13 is turned outwards of the magnetic disk 15 and the merge lip 101 is brought into engagement with the ramp 17 to retract a femto slider 113. This operation is designated unloading of the slider. On the other hand, the operation for moving the slider from the ramp 17 to a position over the surface of the magnetic disk 15 is designated loading. The method using the ramp 17 as a retraction area for the slider as in this example is designated a load/unload method.

Not only a femto low linear velocity drive of the load/unload type but also a femto low linear velocity drive of a contact start stop type having a retraction area in part of the magnetic disk 15 is included in the present invention. The magnetic disk 15 rotates in the direction of arrow A, which is a forward rotation rotating from the pivot shaft 23 side in AHSA 13 toward the merge lip 101.

However, not only the magnetic disk drive of such a forward rotation but also a magnetic disk drive of a reverse rotation is included in the scope of the present invention.

A non-recording area is provided outside the outermost radius track on the magnetic disk 15. The non-recording area is provided in view of the possibility of collision of the femto slider 113 (FIG. 2) against the surface of the magnetic disk at the time of loading of the slider from the ramp 17. The width of the non-recording area is determined on the basis of an external form of the slider 113 skewed near the outermost radius track. However, since the femto slider 113 is smaller in external size than the pico slider, the recording area can be increased about 10% by narrowing the width of the non-recording area in the case where the diameter of the magnetic disk 15 is 1 inch.

Figure 2:
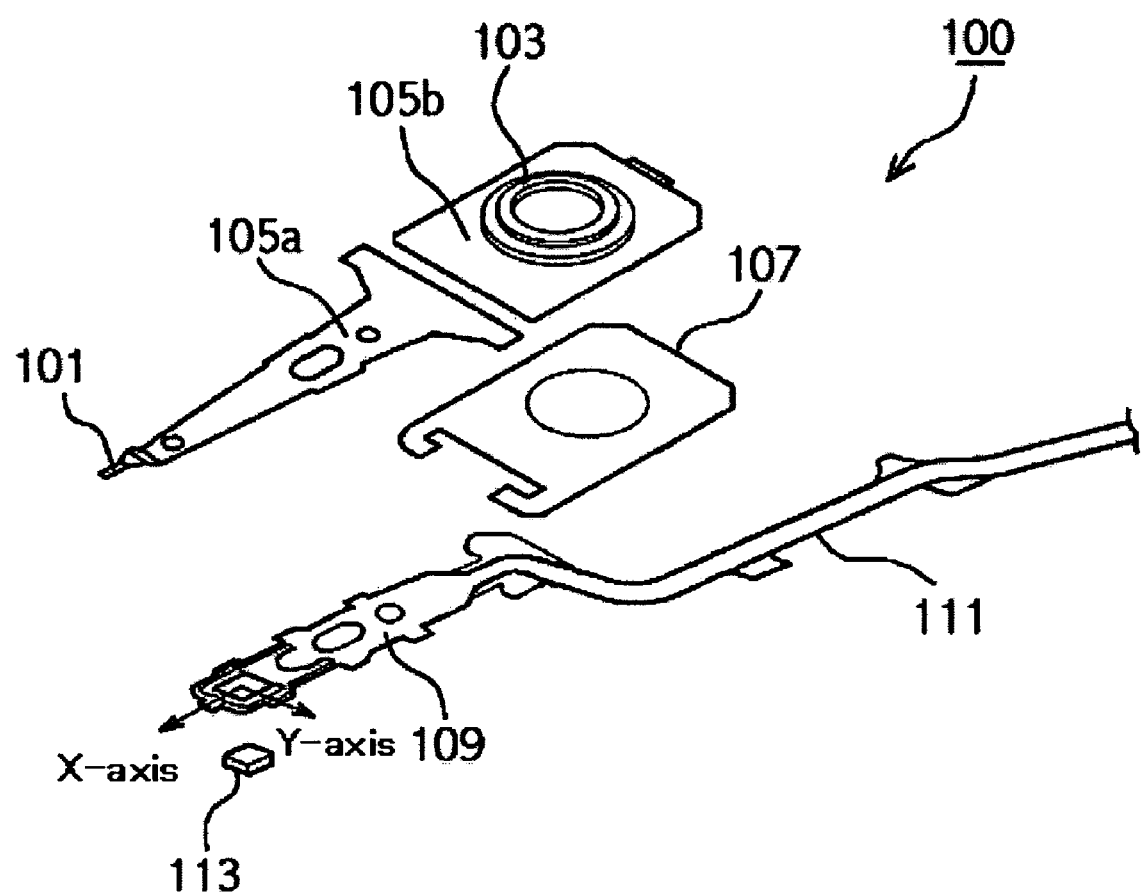
FIG. 2 is an exploded perspective view of a head suspension assembly.

FIG. 2 is an exploded perspective view of the HSA 100 according to this embodiment. The HSA 100 is constituted as a multi-piece type suspension assembly comprising a mounting plate 103, an arm portion 105*a* of a load beam, a fixed portion 105*b* of the load beam, a hinge 107, a flexure 109, a femto slider 113, and a wiring layer 111. In the present invention, it is not necessary to restrict the structure of HSA 100 to the one just described. There may be adopted another structure of HSA such as a stack type suspension wherein suspensions are stacked through spacers around a pivot cartridge.

The femto slider 113 is attached to the flexure 109 on the side opposed to the surface of the magnetic disk 15. The femto slider 113 is formed with a head (not shown) for read and/or write of data. The femto slider is one called a negative pressure type slider, with a negative pressure generating portion being formed on ABS. The negative pressure generating portion is provided for generating a negative pressure as a force created by an air current in a direction in which the slider 113 is approximated to the surface of the magnetic disk 15 to enhance the air film stiffness of the air bearing, or for compensating a flying sensitivity based on skew angle, or for decreasing the amount of change in flying height caused by a change in atmospheric pressure which will be described later to attain a stable flying performance. With the mounting plate 103, the HSA 100 is mounted to an actuator arm of the actuator assembly 21.

The load beam is composed of an arm portion 105*a* and a fixing portion 105*b*. The arm portion 105*a* supports the flexure 109 while imparting a gram load thereto. The fixed portion 105*b* has a mounting structure for mounting to the actuator arm. The hinge 107 has a spring structure and functions to connect the arm portion 105*a* and the fixed portion 105*b* with each other and impart an elastic force to the arm portion 105*a* of the load beam, thereby imparting to the femto slider 113 a gram load acting toward the surface of the magnetic disk 15. The wiring layer 111 is connected at one end thereof to a head formed on the slider 113 and has a stacked structure of a dielectric layer, a conductor layer and a protective layer formed on the surface of the metallic layer of the flexure 109 by a photolithographic etching process.

Figure 3:
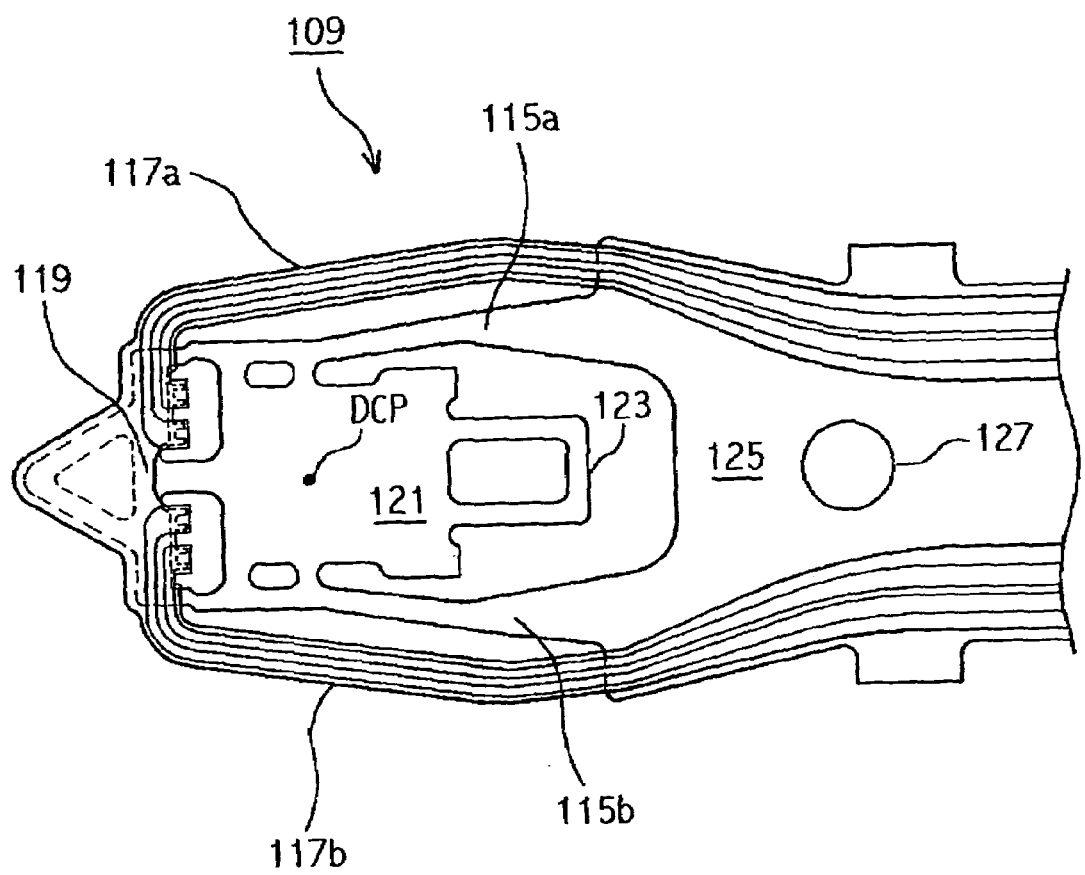
FIG. 3 is a plan view of a flexure which constitutes the head suspension assembly.

FIG. 3 is a plan view of the flexure 109 shown in FIG. 2 and as seen from the magnetic disk 15 side with the slider 113 removed. The whole of the flexure 109 is formed by a thin stainless steel layer and a part of a support area 125 is spot-welded to the arm portion 105*a* of the load beam at a welding spot 127. A pair of arms 115*a* and 115*b* extend from the support area 125 toward a distal end side of the load beam arm portion 105*a* and are united in a distal end area 119. Further, in the flexure 109, a flexure tongue 121 is formed so as to be supported by the distal end area 119 and the arms 115*a*, 115*b*.

A DCP is defined nearly centrally of the flexure tongue 121 and the femto slider 113 is fixed to the flexure tongue 121 so that the DCP is positioned nearly centrally.

Further, wiring layers 117*a* and 117*b* are formed in a stacked state on the metallic layer, then are separated from the metallic layer at an end portion of the support area 125 and terminate so as to match the position of bonding pads formed on the femto slider 113. A limiter 123 is formed on the actuator assembly 21 side of the flexure tongue 121 to prevent the flexure tongue 121 from jumping up to excess by vibration.

Figure 4:
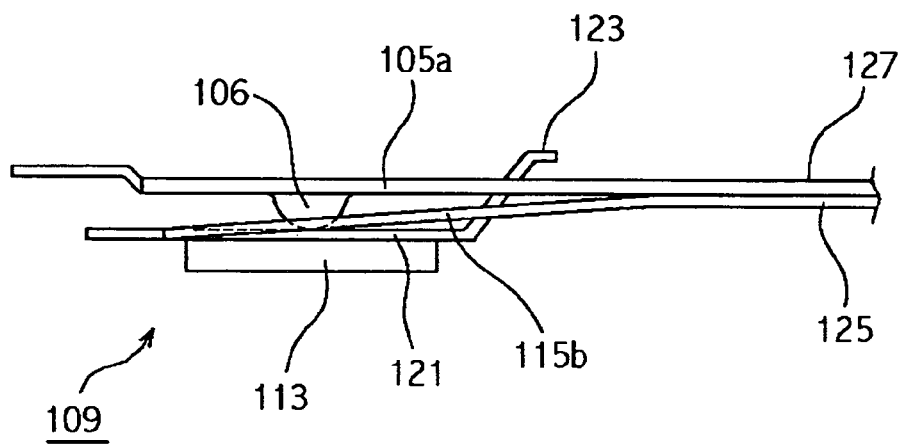
FIG. 4 is a side view of the head suspension assembly.

FIG. 4 is a side view of the arm portion 105*a* of the load beam and the flexure 109 both shown in FIG. 2. The flexure tongue 121 is supported by a cantilevered spring structure, the cantilevered spring structure comprising the support area 125 of the metallic layer welded at the welding spot 127 to the arm portion 105*a* of the load beam and the two arms 115*a* and 115*b*. A dimple 106 is formed in the load beam arm portion 105*a* by press working. The dimple 106 may be formed in the flexure tongue 121 and a DCP may be defined in the arm portion 105*a* of the load beam.

The dimple 106 pushes the DCP which is defined nearly centrally of the back side opposite to the mounting side for mounting the slider of the flexure tongue 121, and when the force which the ABS of the femto slider 113 receives from the air current created on the surface of the magnetic disk 15 changes, the slider flies so as to maintain the spacing between the head and the surface of the magnetic disk 15 while performing a gimbal motion such as pitching or rolling motion.

The rolling motion indicates performing a pivotal motion centered on the dimple 106 around X-axis which is assumed in the longitudinal direction of the HSA 100 when the femto slider 113 flies over the surface of the magnetic disk 15. The pitching motion indicates performing a pivotal motion around Y-axis, the Y-axis passing through the DCP and being perpendicular to the X-axis and included in a plane parallel to the surface of the magnetic disk.

Characteristics of the gimbal motion are determined by the entire structure of the HSA 100, but unless there is adopted a structure involving appropriately set pitch static attitude "PSA", pitch stiffness "Kp" and gram load "GL" in the HSA 100 used for the femto low linear velocity drive, it is virtually impossible to cope with the above-mentioned problem.

Gram Load "GL"

Figure 5:
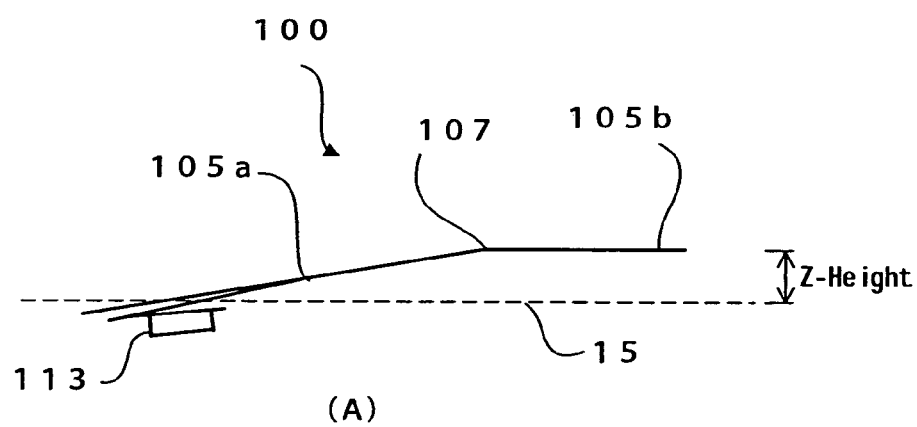
FIGS. 5(A) and 5(B) are diagrams explanatory of a gram load "GL".
Figure 5:
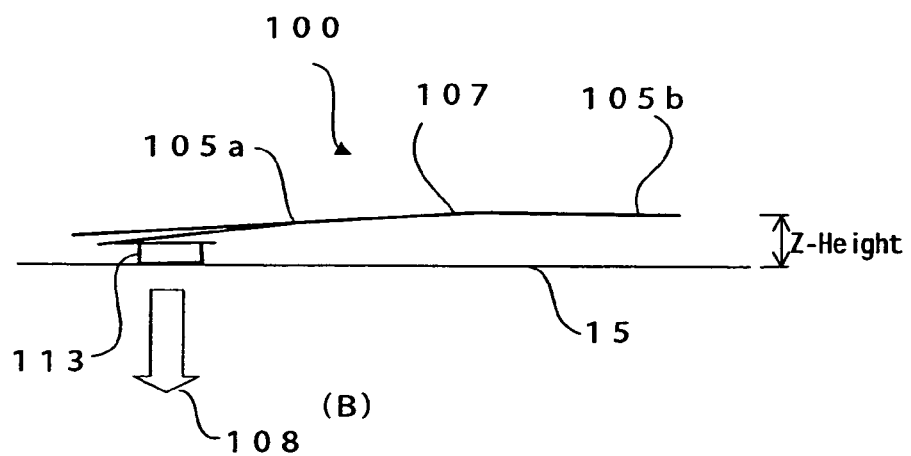

Next, with reference to FIG. 5, a description will be given of the gram load of the HSA 100. FIG. 5 illustrates a side face of the HSA 100 schematically. FIG. 5(A) illustrates a posture which the HSA 100 mounted to the actuator arm (not shown) of the actuator assembly 21 exhibits on the assumption that the magnetic disk 15 is not present. The fixed portion 105b of the load beam is secured to the actuator arm of the actuator assembly 21. The arm portion 105a of the load beam is connected to the fixed portion 105b of the load beam through the hinge 107.

The distance between the surface of the actuator arm to which the mounting plate 103 is fixed by swaging and the surface of the magnetic disk 15 is designated Z-Height. In FIG. 5(A), when the magnetic disk 15 is removed, the elastic force of the hinge 107 is released completely, so that the femto slider 113 is positioned lower than the magnetic position 15 and is stable. Such a bias load is imposed on the hinge 107 beforehand.

In FIG. 5(A), for the convenience of explanation, only the HSA corresponding to the upper side of the magnetic disk 15 is described; but if an HSA corresponding to the lower side of the magnetic disk 15 is described, a slider thereof is positioned above the magnetic disk 15 and becomes stable.

FIG. 5(B) shows the posture of the HSA 100 in a state in which the magnetic disk 15 and the AHSA 13 are mounted to the base 11 and the rotation of the magnetic disk 15 is stopped. With the rotation of the magnetic disk 15 OFF, an air current does not occur on the disk surface and therefore the femto slider 113 lands on the surface of the magnetic disk 15.

At this time, as is apparent from a comparison with FIG. 5(A), the position of the femto slider 113 is shifted to the upper side and the elastic force of the hinge 107 causes the femto slider 113 to be pushed against the surface of the magnetic disk 15 (in the direction of arrow 108). Such a force of gram the slider exerts against the surface of the magnetic disk whose rotation is OFF is designated a gram load "GL". The gram load "GL" can be measured as a load acting when gram up the ABS of the femto slider 113 to the position of Z-Height. This measurement can be done by securing the fixed portion 105b of the load beam to a known measuring device.

In a conventional magnetic disk drive using a negative pressure type femto slider and having a minimum track linear velocity of not lower than 5 m/s, the gram load "GL" has been set in the range of 14 mN to 25 mN. In a conventional magnetic disk drive using a negative pressure type pico slider and having a minimum track linear velocity of not higher than 5 m/s, the gram load "GL" has been set in the range of 10 mN to 15 mN. However, it is necessary that the gram load "GL" of HSA 100 in the femto low linear velocity drive be determined taking into account a viewpoint different from that of the conventional magnetic disk drives.

Lower Limit Value of Gram Load "GL"

In the femto low linear velocity drive, the flow velocity of an air current decreases when the linear velocity of the innermost radius track is in the range of exceeding 1 m/s and lower than 5 m/s, and a positive pressure which ABS receives from the air current decreases because the area of ABS is only about half of that of the pico slider. Therefore, a general method for allowing the slider to fly under such conditions is to decrease the gram load "GL" so as to permit balance with a positive pressure. However, if an initial flexural angle of the hinge 107 is set small or if the spring constant is made small by, for example, replacing the material of the hinge 107 with a soft material to decrease the gram load, the impact resistance in operation decreases and when a shock is given to the magnetic disk drive 10 during operation in a direction perpendicular to the surface of the magnetic disk 15, the femto slider 113 jumps up away from the magnetic disk 15 and then strikes against the disk surface with a restoring reaction force, thus raising the concern of damage to the disk surface.

Figure 6:
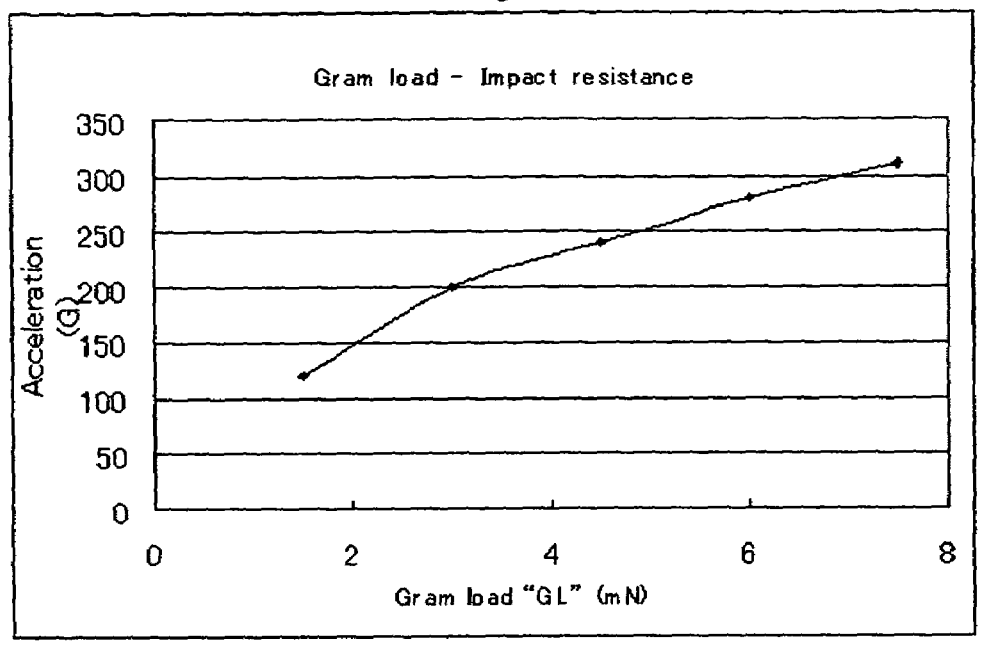
FIG. 6 is a graph showing a relation between the gram load "GL" and impact resistance in operation.

The impact resistance in operation varies depending on the gram load "GL" of the load beam 13, the weight of the HSA 100, the length of the load beam 13 and the air film stiffness of the slider. In this connection, a lower limit value of the gram load "GL" suitable for the femto low linear velocity drive will now be described with reference to FIG. 6. FIG. 6 is a graph showing the impact resistance in operation against the gram load "GL" in the femto low linear velocity drive. In FIG. 6, the magnetic disk drive 10 is operated to write data and various shocks are given to the magnetic disk drive; thereafter, shock acceleration values at a boundary at which a hard error occurs are plotted after reading operation. Further, the gram load "GL" is changed variously and shock acceleration values at a boundary at which a hard error occurs are plotted.

That a shock is given after the write of data onto the magnetic disk 15 and a hard error occurred upon subsequent read of data is presumed to mean that data cannot be read correctly even after execution of an error correction program and that therefore the femto slider 113 struck against the magnetic disk 15 with consequent damage to the disk surface and inability to reproduce data. The shock was given by dropping the magnetic disk drive 10 from a height meeting the condition that a predetermined shock acceleration value G should be obtained. As is apparent from FIG. 6, as the gram load "GL" is decreased, the shock acceleration value indicating a boundary of occurrence of a hard error becomes smaller. If a hard error does not occur up to a shock acceleration value of 200 G, it is presumed that there will arise no problem in practical use even if the magnetic disk drive 10 is mounted on a portable electronic device such as a notebook-size personal computer. Therefore, it can be said that the magnetic disk drive can be applied to a practical use if the lower limit of the gram load "GL" is set at 3 mN.

The gram load "GL" cannot be determined from only the point of impact resistance. For stopping the rotation of the magnetic disk 15 in normal operation of the load/unload type magnetic disk drive, the merge lip 101 of AHSA 13 is allowed to slide on a retraction surface of the ramp 17 by controlling the voice coil motor, so that the AHSA 13 strikes lightly against an outer crash stop (not shown) and the femto slider 113 can retract to the ramp 17. However, in the event the power supply is cut off suddenly during operation, it is necessary that the femto slider 113 be retracted to the ramp 17 before the rotation of the magnetic disk 15 stops.

Usually, in the case of a magnetic disk drive having a magnetic disk of a small diameter, the AHSA 13 is retracted to the ramp 17 at a relatively high speed by utilizing an electric charge discharged from a capacitor, there sometimes occurs a rebounding problem such that the slider 113 returns to the surface of the disk 15 by reaction resulting from crash against the outer crash stop. Generally, an actuator latch mechanism is provided for prevention of such rebounding. However, it is also important to ensure friction between the merge lip 101 and the retraction surface of the ramp 17 on which the merge lip 101 slides. A frictional force is greatly influenced by the gram load "GL" although it is also influenced by the material of the ramp 17. From this standpoint, a value exceeding about 3 mN is a minimum required value of the gram load "GL".

It takes another meaning that the gram load "GL" is set to a value exceeding about 3 mN. As a method of decreasing the gram load "GL" to improve the impact resistance there is mentioned a method involving reducing the weight of the load beam. In this case, if the weight of the hinge 107 is reduced to attain a gram load of not higher than about 3 mN, the hinge undergoes a plastic deformation although it is possible to avoid the problem of jumping-up of the femto slider 113 caused by a shock and the problem of crash of the slider against the magnetic disk 15. Also from this standpoint it is necessary to set the gram load "GL" at a value exceeding 3 mN.

Upper Limit Value of Gram Load "GL"

In a conventional magnetic disk drive using a pico slider and having a low track linear velocity, an upper limit value of the gram load "GL" has been determined taking note of an upper limit of an electric current value in the voice coil motor required at the time of loading or unloading. This is because if the gram load "GL" is set large, a frictional force induced between the merge lip and the ramp becomes large and therefore the torque required for the voice coil motor increases, with a consequent increase of the electric current, thus giving rise to problems related to power consumption and circuit design. In the case of a conventional magnetic disk drive using a femto slider and having a high track linear velocity, an upper limit of the gram load has been determined taking note of preventing wear of the ramp caused by the merge lip.

In the femto low linear velocity drive, unlike the conventional gram load determining method, it is necessary that an upper limit value of the gram load "GL" be determined taking into account the recording density and the amount of change in flying height caused by a change in atmospheric pressure. The amount of change in flying height caused by a change in atmospheric pressure indicates a ratio of increase or decrease in flying height of the slider upon change in atmospheric pressure of the environment in which the magnetic disk drive 10 is used. A positive pressure which the ABS of the femto slider 113 receives decreases as the density of an air current becomes lower, so in the case of a magnetic disk drive whose use in a high land, such as the use as a portable type, ought to be considered, it is required that the slider fly at an appropriate height even in such a place. Therefore, it is preferable that the amount of change in flying height caused by a change in atmospheric pressure of HSA be small.

As the gram load in the magnetic disk drive which operates at a standard atmospheric pressure (1 atm) is made larger than 3 mN, the flying height of the femto slider 113 decreases accordingly. Magnetic disk drives are generally designed so as be employable at a height of 10,000 feet (about 3,000 m) above sea level. The height of 3,000 m corresponds to about 0.7 atm, at which the density of air decreases 30%, and therefore the flying height of the slider lowers in comparison with that at the standard atmospheric pressure even assuming that the gram load "GL" is the same.

Figure 7:
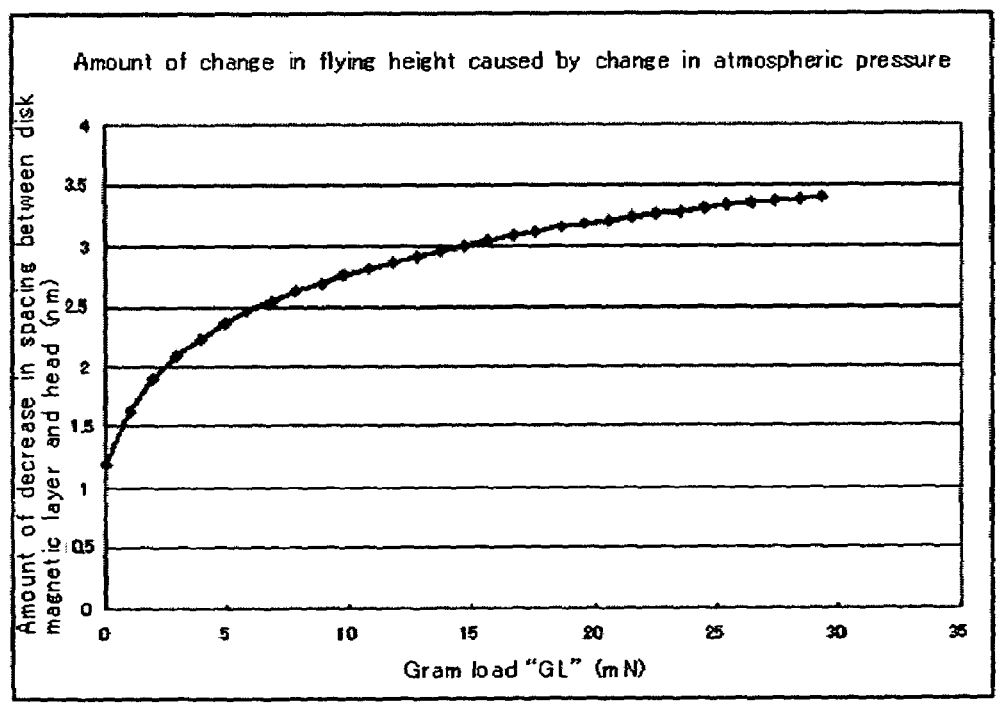
FIG. 7 is a graph showing a relation between the gram load "GL" and the amount of change in flying height caused by a change in atmospheric pressure.

FIG. 7 is a graph in which calculated values of decreases in flying height obtained under the condition of the femto slider 113 being flied at an altitude of 10,000 feet (about 3,000 m) while ensuring the head-disk magnetic layer spacing on the ground of the standard atmospheric pressure of about 30 nm are plotted. At this time, the flying height which is defined as the spacing between the surface of the protective layer on the magnetic disk 15 and the head is about 15 nm. In FIG. 7 it is shown that the higher the gram load "GL", the smaller the head-disk magnetic layer spacing, i.e., flying height, at the altitude of 3,000 m and the larger the amount of change in flying height caused by a change in atmospheric pressure. This is because the gram load "GL" is not dependent on the atmospheric pressure of the environment in which the magnetic disk drive 10 operates.

In the negative pressure type femto slider 113, the amount of change in flying height caused by a change in atmospheric pressure can be suppressed to a certain extent because a negative pressure also decreases with a decrease of atmospheric pressure. However, most of the amount of change in flying height caused by a change in atmospheric pressure is predominated by the magnitude of the gram load "GL". In determining an upper limit of the gram load "GL" it is necessary to taken into account that the slider is sure to fly even at an altitude of 3,000 m.

Therefore, it is necessary that the flying height on the ground of the standard atmospheric pressure be set in consideration of the amount of change in flying height caused by a change in atmospheric pressure at an altitude of 3,000 m. However, if the flying height under the standard atmospheric pressure is set high, the spacing between the head and the magnetic layer of the magnetic disk becomes wider and the recording density decreases. This is not desirable. In this embodiment, an upper limit of the amount of change in flying height caused by a change in atmospheric pressure is set at 10%, the spacing between the head and the disk magnetic layer surface corresponding to the flying height on the ground (sea level) of the atmospheric pressure plus the thickness of the protective layer is set at 30 nm, and the amount of decrease in flying height at an altitude of 3,000 m is set at 10%, i.e., 3 nm, of the disk magnetic layer-head spacing. If the amount of change in flying height caused by a change in atmospheric pressure is not larger than 10%, it is possible to fabricate a femto slider having an air film stiffness that does not bring about the problem of crash between the femto slider 113 and the magnetic disk 15. Moreover, the problem of ensuring a high recording density and the problem of crash of the femto slider 113 against the magnetic disk 15 can be solved in a well-balanced manner.

In FIG. 7 it is shown that the gram load "GL" should be lower than about 15 mN in order to make the amount of decrease in the disk magnetic layer-head spacing 3 nm or less. In this embodiment, therefore, the value of 15 mN at which the amount of change in flying height caused by a change in atmospheric pressure becomes 10% is set as an upper limit of the gram load "GL". If the gram load "GL" is set at a value of not lower than about 15 mN, it is difficult to fabricate a negative pressure type slider for which the amount of change in flying height caused by a change in atmospheric pressure is set at a value of not larger than 10%. Although the upper limit of the gram load "GL" is here set with respect to the case where the flying height at the standard atmospheric pressure is about 15 nm (the spacing between the disk magnetic layer and the head is 30 nm) as an example, a consideration is given to an ordinary type of a slider so that the problem of contact of the slider with the magnetic disk does not occur even if the flying height decreases 10% or so of the spacing between the disk magnetic layer surface and the head at the standard atmospheric pressure. Thus, setting the upper limit of the gram load at about 15 mN is also applicable to a slider whose flying height at the standard atmospheric pressure is different from that in this embodiment. If the gram load "GL" is set too high, the frictional force induced between the ramp and the merge lip becomes large with consequent increase in power consumption of VCM for retraction of the slider or increase in the amount of wear of the ramp. Therefore, it is necessary to set the upper limit of "GL" at about 15 mN.

In the present embodiment, as described above, if the gram load of the HSA 100 in the femto low linear velocity drive is set at a value exceeding about 3 mN and smaller than about 15 mN, it is possible to obtain a good performance in point of impact resistance in operation and also in point of what countermeasure is to be taken against the change in flying height caused by a change in atmospheric pressure.

As noted earlier, in setting the gram load "GL", it is important to maintain various factors in a well-balanced state, including ensuring of impact resistance, wear of the ramp, power consumption of VCM required for retraction of the slider, and the amount of change in flying height caused by a change in atmospheric pressure. If the gram load "GL" is set at a value exceeding about 6 mN and lower than about 13 mN, then in an ordinary magnetic disk drive, the above factors can be maintained in a well-balanced manner. Further, if the gram load "GL" is set at a value exceeding about 7 mN and lower than about 12 mN, then in an ordinary magnetic disk drive, the above factors can be maintained in an optimum condition.

Pitch Static Attitude "PSA" and Pitch stiffness "Kp"

Figure 8:
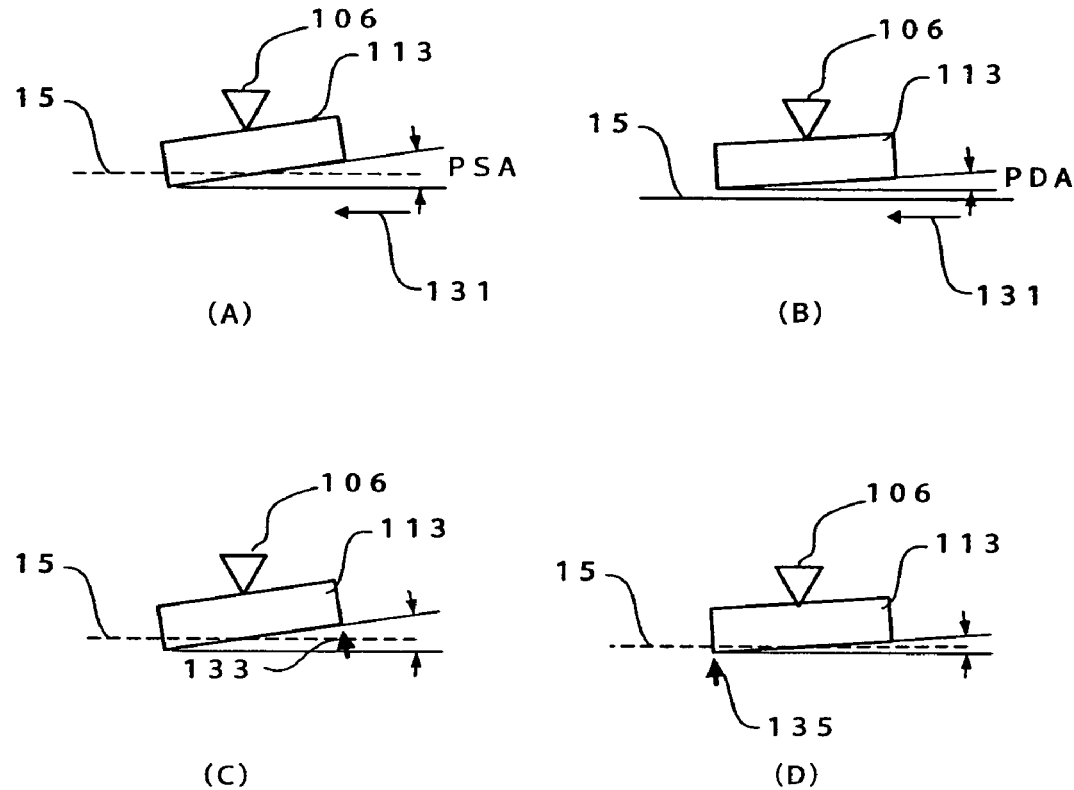
FIGS. 8(A) to 8(D) are diagrams explanatory of a pitch static attitude "PSA" and pitch stiffness "Kp".

In the femto low linear velocity drive, it is necessary for the HSA 100 to have appropriately set pitch static attitude "PSA" and pitch stiffness "Kp" in addition to the gram load "GL". FIG. 8 illustrates definitions and measuring methods of pitch static attitude "PSA" and pitch stiffness "Kp". FIG. 8(A) schematically shows a posture which the femto slider 113 assumes when force is applied to the merge lip 101 or the load beam arm portion 105a so that the fixed portion 105b of the load beam and the center of ABS of the slider 113 are in a relation of Z-Height, as described earlier in connection with FIGS. 5(A) and 5(B). The magnetic disk 15 which rotates in the direction of arrow 131 is described for reference. The femto slider 113 fixed to the flexure tongue 121 (FIG. 4) has a predetermined pitch angle "PSA" (deg) in the pitch direction and centered at the dimple 106 (FIG. 4) formed in the arm portion 105a of the load beam. The flexure tongue 121 and the arm portion 105a of the load beam are omitted in FIG. 8(A).

The pitch angle "PSA" just referred to above indicates an angle of ABS relative to the surface of the magnetic disk 15 when the position corresponding to DCP of ABS is set at the position of Z-Height without application of any force to the femto slider 113 and in a state in which the femto slider 113 does not undergo any influence of an air current from the magnetic disk 15. This angle is designated a pitch static attitude "PSA" (deg). The pitch static attitude "PSA" is measured in a state in which the HSA 100 is not mounted to the base 11 (FIG. 1). The pitch static attitude "PSA" is marked positive when the leading edge side of the femto slider 113 retains a posture in a direction away from the surface of the magnetic disk 15 with respect to the trailing edge side (the state of FIG. 8(A)) and is marked negative when the leading edge side retains a posture in a direction approaching the disk surface. If ABS is parallel to the surface of the magnetic disk 15, the pitch static attitude "PSA" is zero. As to the pitch static attitude "PSA", there is a tolerance of a certain range in manufacture. When the femto slider takes a value of pitch static attitude "PSA" which is allowable in the range of the tolerance, it must exhibit an appropriate kinetic performance for gimbal motion.

FIG. 8(B) shows an angle of ABS relative to the surface of the magnetic disk 15 when HSA 100 is installed as part of the magnetic disk drive 10 and the magnetic disk 15 is rotated at its rated rotational speed. This angle is here designated a pitch dynamic attitude (PDA). The femto slider 113 maintains the pitch dynamic attitude "PDA" when flying at a predetermined flying height. For the femto slider 113 to perform an appropriate gimbal motion, it is necessary for the pitch dynamic attitude "PDA" to maintain a somewhat positive angle. In this embodiment, the pitch dynamic attitude "PDA" of the femto slider 113 is several tens of micro radians.

FIGS. 8(C) and (D) illustrate a definition and a measuring method of the pitch stiffness "Kp". FIG. 8(C) shows in what state the pitch angle changes in the positive direction as a result of applying force that arises from having the femto slider 113 located at the position of Z-Height as seen in FIG. 8(A) and force applied to the leading edge side of the slider 113 in the direction of arrow 133. The force is applied in the arrow 133 direction in the vicinity of a position where the leading edge of ABS and a longitudinal centerline of the femto slider 113 cross each other. An elastic force which the flexure tongue 121 (FIG. 4) exhibits in the pitch direction is the pitch stiffness "Kp" (Nm/deg). FIG. 8(D) shows a state in which force 135 is applied to near the center of the trailing edge of ABS to change the pitch angle in the negative direction and the pitch stiffness "Kp" is measured. No matter in which of positive and negative directions the pitch angle may be changed, the pitch stiffness "Kp" assumes approximately the same value.

In a conventional magnetic disk drive using a negative pressure type femto slider and having a minimum track linear velocity exceeding 5 m/s, the pitch static attitude "PSA" has been set in the range of 0 to 2 deg and the pitch stiffness "Kp" has been set in the range of 0.5 to 1 Nm/deg. In a conventional magnetic disk drive using a negative pressure type pico slider and having a minimum track linear velocity of not higher than 5 m/s, "PSA" has been set in the range of −1 to 2 deg and "Kp" has been set in the range of 0.7 to 1.2 Nm/deg.

Actually, a certain tolerance is admitted and even a magnetic disk drive involving a negative "PSA" is used without any problem in performance. However, in HSA 100 used in the femto low linear velocity drive, as compared with the conventional magnetic disk drive, bi-stable height and semi-stable drag are apt to occur, or the flying height does not become stable, so it is necessary to appropriately effect setting and combination of values of gram load "GL", pitch static attitude "PSA" and pitch stiffness "Kp".

Upper Limit Value of Pitch Static Attitude "PSA"

Figure 9:
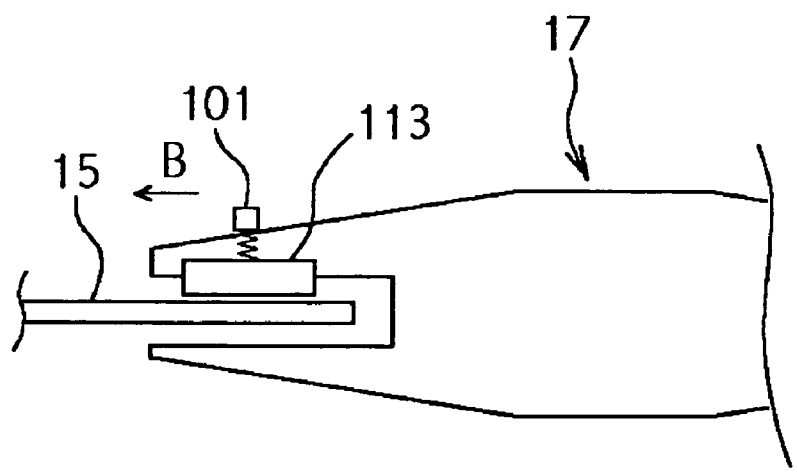
FIG. 9 is a diagram explanatory of behavior of a slider during loading.

FIG. 9 illustrates the behavior of the femto slider 113 in loading. In the same figure there is shown a state in which AHSA 13 (FIG. 1) rotates in the direction of arrow B when the magnetic disk 15 is rotating in the direction of arrow A (FIG. 1) and the femto slider 113 flies over the surface of the magnetic disk 15. The point that the femto slider 113 is supported by the spring structure of the flexure 109 is depicted exaggeratedly in the figure. As the merge lip 101 descends on a slant surface of the ramp 17, the ABS of the femto slider 113 approaches the surface of the magnetic disk 15 and is gradually influenced by an air current. However, since the spacing between the ABS and the magnetic disk surface is wider than the normal flying height, the posture in the pitch direction of the femto slider 113 is predominated by the pitch static attitude "PSA" described above in connection with FIG. 8(A).

If the AHSA 13 is further rotated in the direction of arrow B, the merge lip 101 eventually leaves the slant surface of the ramp 17, but at this time it is preferable for the femto slider 113 to fly at the posture of pitch dynamic attitude "PDA" shown in FIG. 8(B) and in a position where the gram load of the load beam arm portion 105a and the positive and negative pressures acting on the slider 113 are balanced. However, in the femto low linear velocity drive using the negative pressure type femto slider 113, there sometimes occurs a case where the posture of the femto slider 113 does not shift to the posture of pitch dynamic attitude "PDA", but assumes a posture intermediate between pitch static attitude "PSA" and pitch dynamic attitude "PDA", with consequent occurrence of fly-high.

Figure 10:
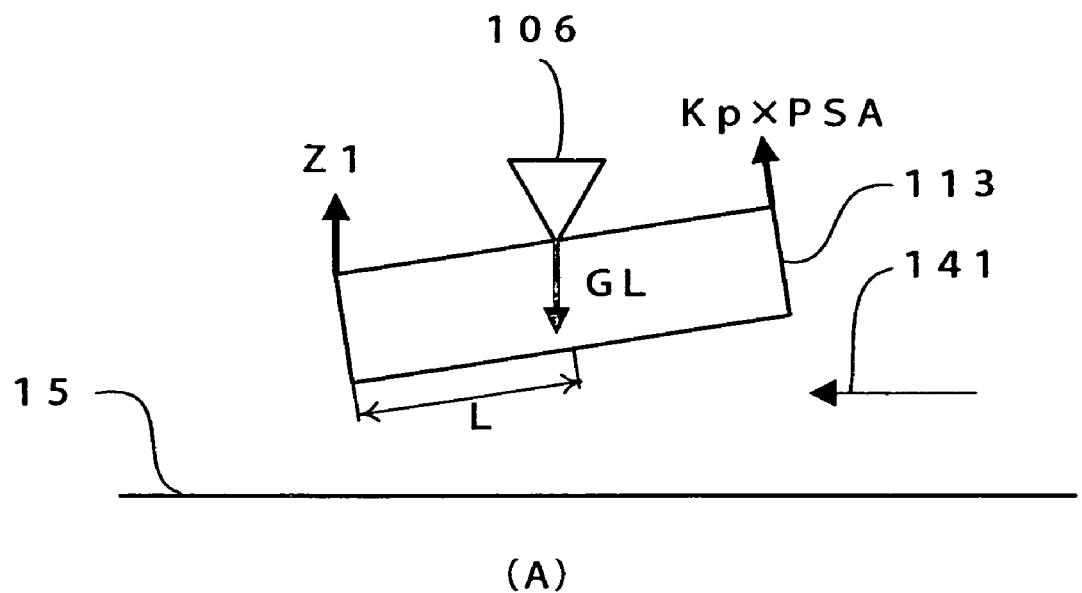
FIGS. 10(A) and 10(B) are diagrams explanatory of bi-stable height and semi-stable drag.
Figure 10:
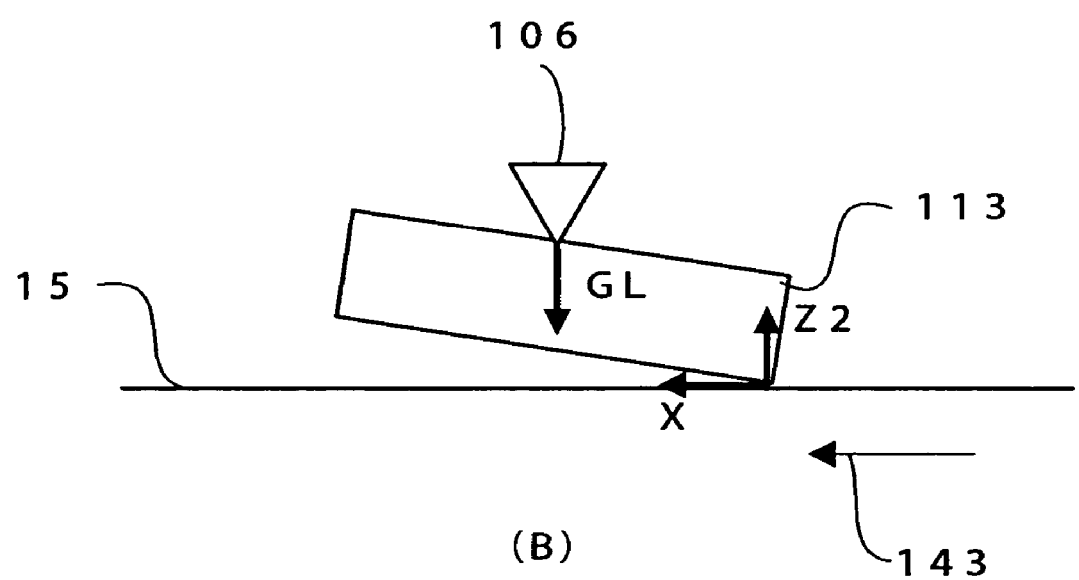

A description will now be given with reference to FIG. 10(A) about the reason that fly-high is apt to occur in the femto low linear velocity drive using the negative pressure type femto slider 113. FIG. 10(A) shows a force acting on the femto slider 113 during shift of the femto slider from pitch static attitude "PSA" to pitch dynamic attitude "PDA". First, for the femto slider 113 to maintain a predetermined pitch dynamic attitude "PDA", it is necessary that the flying height of the femto slider 113 be a normal flying height, that a wedge-like air flow path be formed between ABS and the surface of the magnetic disk 15, allowing an air current to pass therethrough in the direction of arrow 141, and that predetermined positive and negative pressures are developed in ABS.

In the state of FIG. 10(A), a normal wedge-like air flow path has not been formed yet between ABS and the magnetic disk 15 because it is just after loading and most of the pressure developed is a positive pressure while development of a negative pressure is little. The negative pressure type femto slider 113 is of a construction which permits the slider to fly at a normal flying height under a balanced state of the gram load "GL" with positive and negative pressures. However, if the gram load "GL" is low, a sufficient negative pressure cannot be obtained at a high flying position just after loading, so that the force for controlling the flying height of the slider to the normal flying height becomes weak. In the case of a positive pressure type slider not having a negative pressure portion, fly-high does not occur because of a construction wherein it is only the gram load, not dependent on a negative pressure portion, that balances with the positive pressure. Once the state of fly-high occurs, it becomes impossible for the head to read servo information and there occurs an error caused by an improper positioning of the head or a problem such that it is impossible to effect correct read and write although servo information can be read.

When the dimple 106 pushes the femto slider 113 in the surface direction of the magnetic disk 15 at the gram load "GL", the reaction force Z1 which the trailing edge of the femto slider 113 receives from the air bearing is smaller by an amount corresponding to a lowering of the gram load "GL". Further, the length L from the center of the femto slider 113 up to the trailing edge is about 70% of that of the pico slider. Therefore, in the femto slider 113, Z1×L, which is a moment for changing the pitch angle in the negative direction, is small.

Figure 11:
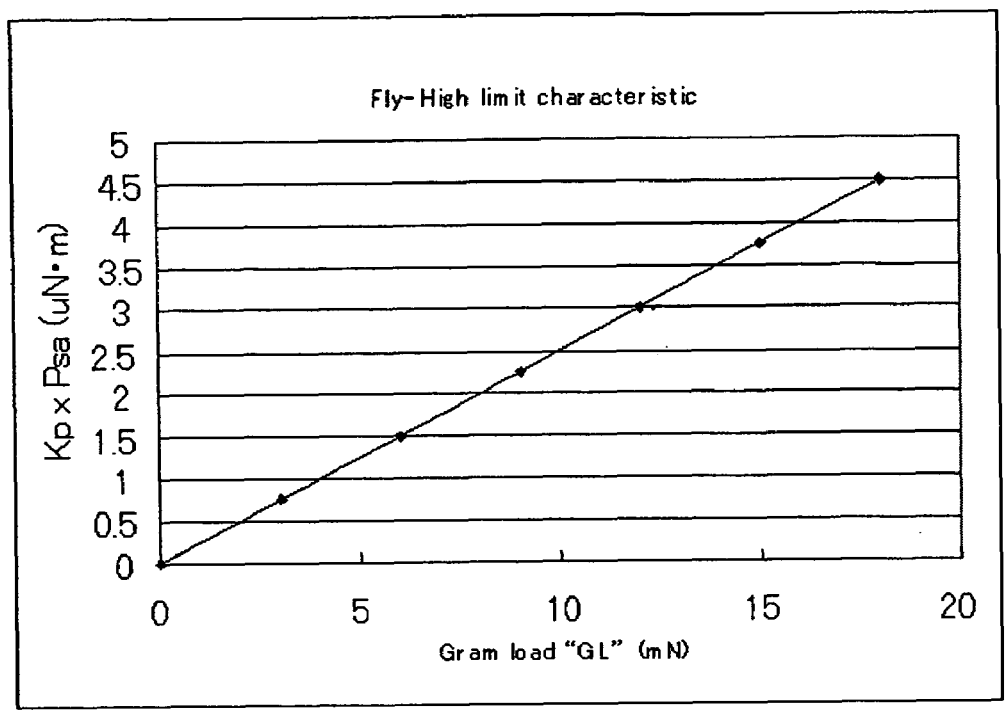
FIG. 11 is a graph showing a fly-high limit characteristic.

On the other hand, when the pitch angle of the femto slider 113 after loading from the ramp 17 tends to approach the pitch dynamic attitude "PDA" from the pitch static attitude "PSA," a force acting to prevent such approaching can be represented as Kp×PSA as will also be seen from the explanation referring to FIGS. 8(A) to 8(D). Thus, for preventing the occurrence of fly-high, it is necessary to set an upper limit at the value of Kp×PSA, provided the upper limit value of Kp×PSA depends on the gram load "GL". FIG. 11 shows conditions for the occurrence of fly-high which have been determined by numerical calculations.

FIG. 11 is a graph showing a fly-high limit characteristic obtained by changing pitch stiffness "Kp" (Nm/deg) and pitch static attitude "PSA" (deg) variously and plotting PSA×Kp values relative to gram loads "GL" upon occurrence of fly-high. When fly-high occurs, the spacing between the head and the disk magnetic layer becomes wider and the gain of an automatic gain controller within a read channel formed for reading servo information increases. Therefore, the occurrence of fly-high can be detected by monitoring the gain. In FIG. 11, the Kp×PSA characteristic changes linearly relative to the gram load "GL", showing that if the value of Kp×PSA relative to the gram load "GL" in a certain femto low linear velocity drive is smaller than the corresponding value of Kp×PSA given in FIG. 11, fly-high does not occur. Thus, reference to the inclination of Kp×PSA characteristic in FIG. 11 shows that, in the femto low linear velocity drive, fly-high can be suppressed by satisfying the relationship of ((Kp×PSA)/GL) <0.25 mm.

Lower Limit Value of Pitch Static Attitude "PSA"

FIG. 10(B) shows a state in which a semi-stable drag is occurring stably with the leading edge in contact with the surface of the magnetic disk 15 just after loading of the femto slider 113. In the femto low linear velocity drive, the semi-stable drag occurs in the case where the pitch static attitude "PSA" of the flexure 109 (FIG. 4) is negative. The semi-stable drag is a phenomenon to be avoided because the recording surface of the magnetic disk 15 would be damaged. In the case where the femto slider 113 is adopted for a magnetic disk having a minimum track linear velocity of not lower than about 5 m/s or where a pico slider is adopted for a magnetic disk having a minimum track linear velocity of not higher than about 5 m/s, the semi-stable drag phenomenon does not occur in an ordinary magnetic disk drive even if the pitch static attitude "PSA" of a flexure is negative.

The reason that the semi-stable drag is apt to occur in the femto low linear velocity drive will now be described with reference to FIG. 10(B). In the femto slider 113, if the pitch static attitude "PSA" of the flexure 109 is negative, the leading edge of ABS comes into contact with the surface of the magnetic disk 15 at the time of loading from the ramp 17

(FIG. 1). Even if the pitch static attitude "PSA" is somewhat positive, the same phenomenon may occur because the behavior of the slider 113 just after loading is unstable.

Since the gram load "GL" is applied through the dimple 106 to the femto slider 113 which has come into contact with the surface of the magnetic disk 15, a reaction force acts on the leading edge of ABS in the direction of Z2. The reaction force Z2 is a force acting to rotate the femto slider 113 in a direction in which the pitch angle becomes positive, and contributes to modifying the posture of the femto slider 113 from the semi-stable drag to the pitch dynamic attitude "PDA".

However, since the gram load "GL" of the HSA 100 used in the femto low linear velocity drive is small, the reaction force Z2 is also small accordingly. Further, the magnetic disk 15 is rotating in the direction of arrow 143 and a frictional force X inducing a rotational force which makes the pitch angle negative is exerted on the femto slider 113. Thus, it is presumed that the gram load "GL", reaction force Z2 and the frictional force X are balanced to generate the semi-stable drag.

In the conventional magnetic disk drive, since the gram load "GL" is relatively large, Z2 is also large accordingly, and it is presumed that the slider is easy to rotate in a direction of a positive pitch angle. Further, it is presumed that even if the leading edge of ABS comes into contact with the surface of the magnetic disk, once an air current gets in both ABS and the surface of the magnetic disk 15, an air bearing is formed and the slider can fly while assuming the posture of pitch dynamic attitude "PSA", and that therefore the semi-stable drag does not occur.

In the conventional magnetic disk drive, since the gram load "GL" and the reaction force Z2 are large, the frictional force X is less influential relatively, and therefore the semi-stable drag is considered difficult to occur. In the femto low linear velocity drive, however, the frictional force X is very influential because of a low gram load "GL" and thus it can be said that the semi-stable drag is apt to occur. In the conventional magnetic disk drive, it has been possible for the slider to fly at the posture of pitch dynamic attitude "PDA" even when the pitch static attitude "PSA" is negative, while in the femto low linear velocity drive it is necessary that the pitch static attitude "PSA" of the flexure 109 be set positive in order to avoid the semi-stable drag.

Therefore, for making the pitch static attitude "PSA" of the femto slider used in the femto low linear velocity drive positive, it is preferable that a median value of "PSA" be set at 0.5 deg and a standard deviation be set at 0.15 deg as an example, taking variations in manufacture into account. Thus, if the pitch static attitude "PSA" is set at a value exceeding 0 deg in a range which satisfies the expression ((Kp×PSA)/GL)<0.25 mm, it is possible to avoid both bi-stable height and semi-stable drag. If the pitch static attitude "PSA" is increased while satisfying the above expression, it is required that the slider be lifted higher by the slant surface of the ramp when unloading the slider to the ramp, or else there is a concern that the trailing edge of the slider and the surface of the magnetic disk may contact each other. Lifting the slider higher means increasing Z-Height which has been described in connection with FIGS. 5(A) and 5(B).

Figure 12:
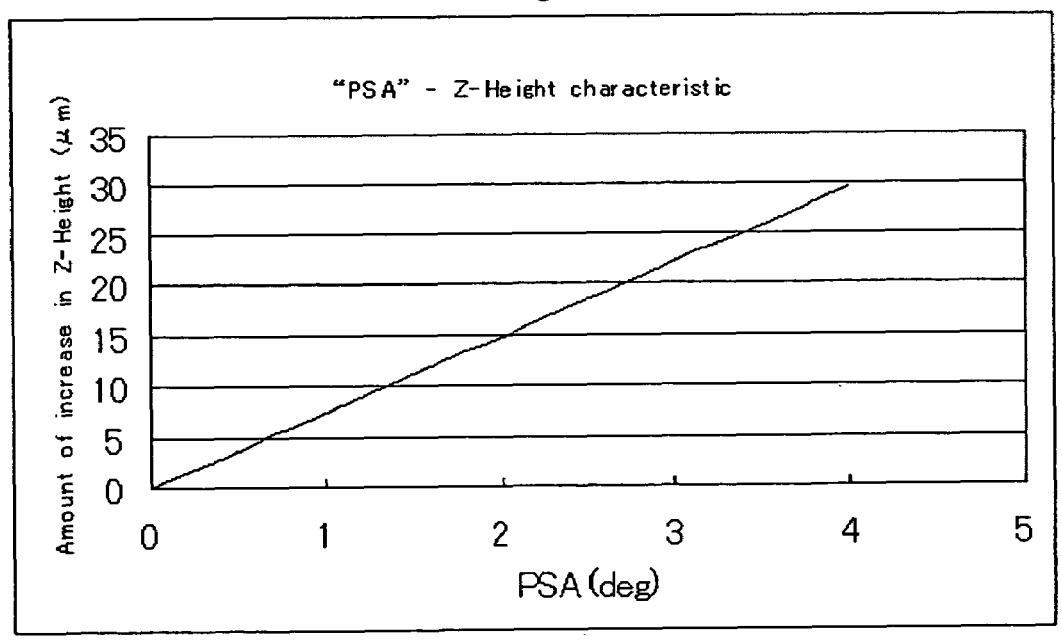
FIG. 12 is a graph showing a calculated result of a relation between the pitch static attitude "PSA" and Z-Height.

FIG. 12 is a graph showing a relation between pitch static attitude "PSA" and Z-Height which has been determined by calculation. In FIG. 12, Z-Height at a pitch static attitude "PSA" of 0 deg is made a reference value and increasing quantities of Z-Height from the reference value with changes of "PSA" are shown. In the same figure it is seen that the larger the pitch static angle "PSA" of the flexure 109, the larger the Z-Height. This corresponds to the fact that the larger the number of magnetic disks or recording surfaces, the larger the thickness of the magnetic disk drive.

In FIG. 12 it is shown that if the pitch static attitude "PSA" exceeds 3 deg, Z-Height increases about 22 μm in comparison with the case where "PSA" is 0 deg. If a pitch static attitude "PSA" larger than 3 deg is applied to a 1-inch type magnetic disk drive with a single magnetic disk of a double-sided recording type mounted thereon, the thickness becomes difficult to satisfy the value of 5 mm conforming to the standard of Compact Flash (CF). Therefore, in a magnetic disk drive carrying a magnetic disk whose nominal size is 1 inch or smaller, it is necessary that the upper limit of pitch static attitude "PSA" be set at about 3 deg.

Since the larger the pitch static attitude "PSA", the more difficult the semi-stable drag becomes to occur, it is preferable that the lower limit of "PSA" be set at about 0.3 deg, most preferably about 0.5 deg. In a magnetic disk drive carrying a magnetic disk whose nominal size is 1 inch or smaller, it is preferable that the upper limit of "PSA" be set at about 2 deg, most preferably about 1.8 deg, whereby the design freedom can be more improved in point of Z-Height.

Pitch stiffness "Kp"

For avoiding fly-high it is desirable that the pitch stiffness "Kp" be small in terms of Kp×PSA including the pitch static attitude "PSA". Further, for avoiding fly-high, as noted above, it is necessary to satisfy the expression ((Kp×PSA)/GL)<0.25 mm taking the gram load "GL" into account. However, if the pitch stiffness "Kp" is made smaller than necessary, the impact resistance is deteriorated while the femto slider 113 is not in operation. The femto slider 113 is retracted to the ramp 17 when it is not in operation. At this time, with reference to FIG. 9, the merge lip 101 is engaged with the retraction surface of the ramp 17 which surface is positioned more distant from the magnetic disk 15 and the femto slider 113 is in a supported state from the flexure 109.

If a shock acting in a direction perpendicular to the magnetic disk is applied from the exterior to the magnetic disk drive 10 when not in operation, an acceleration is applied to the femto slider 113 retracted on the ramp and the slider moves in the pitch direction. A target value of impact resistance in a state of non-operation is larger than that in a state of operation and is generally 10,000 m/s$^2$. In the magnetic disk drive, the pitch stiffness "Kp" was changed variously and a shock of 20,000 m/s$^2$ was applied thereto in a state of non-operation, thereafter, varying values of the pitch static attitude "PSA" were determined by calculation. The results are shown graphically in FIG. 13. From the same figure it is seen that if the pitch stiffness "Kp" is not smaller than about 0.2 Nm/deg, the flexure 109 does not undergo a plastic deformation because the pitch static attitude "PSA" does not change before and after the shock. It is also seen from FIG. 13 that as the pitch stiffness "Kp" of the flexure 109 becomes smaller from near 0.2 Nm/deg, the pitch static attitude "PSA" does not revert after the shock to the value before the shock and that the flexure undergoes a plastic deformation.

Figure 13:
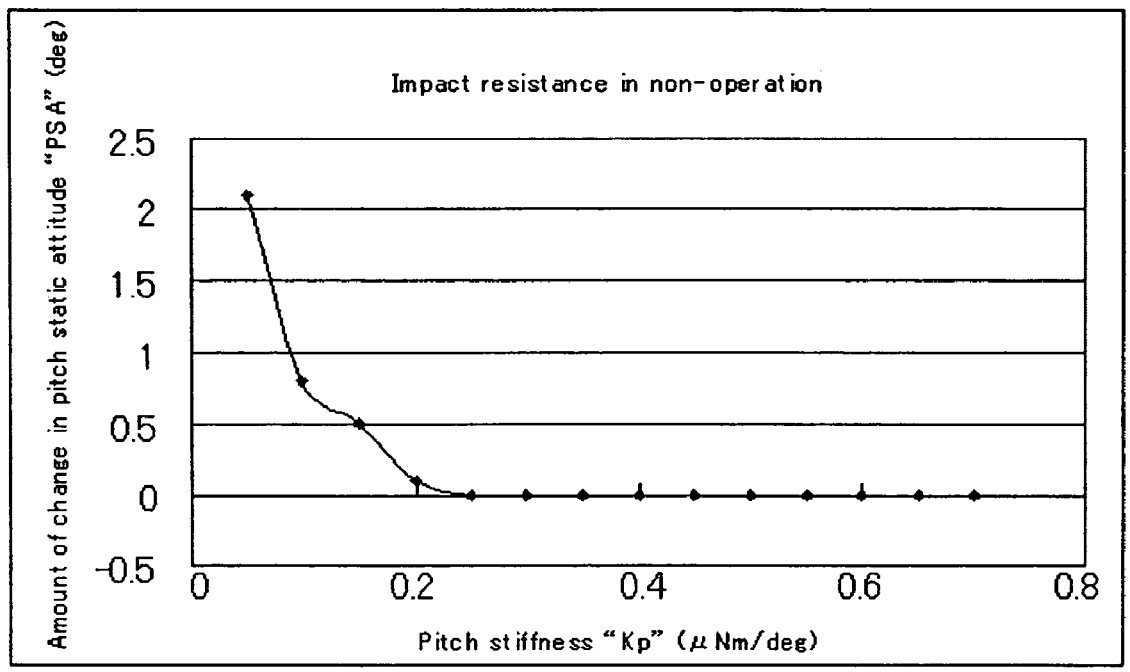
FIG. 13 is a graph showing a calculated result of varying values of the pitch static attitude "PSA" after the application of a shock of 20,000 m/s$^2$ in a state of non-operation.

Thus, according to the results shown in FIG. 13, if the pitch stiffness "Kp" of the flexure 109 is set at "Kp">0.2 Nm/deg, it is possible to surely prevent plastic deformation of the flexure 109 against a shock acceleration of 10,000 m/s$^2$ even under various bad conditions. In point of motion performance for allowing the flexure 109 to perform a satisfactory gimbal motion and stabilize flying of the slider, it is preferable to set the pitch stiffness "Kp" at Kp<2 Nm/deg.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a magnetic disk having a track, whose linear velocity is from about 1 m/s to about 5 m/s at a rated rotational speed;
   a femto slider having a head which accesses said disk; and
   a head suspension assembly which supports said slider;
   wherein a gram load of the head suspension assembly is from about 3 mN to about 15 mN.

2. A magnetic disk drive according to claim 1, wherein the gram load of said head suspension assembly is from about 6 mN to about 13 mN.

3. A magnetic disk drive according to claim 2, wherein the gram load of said head suspension assembly is from about 7 mN to about 12 mN.

4. A magnetic disk drive according to claim 1, wherein a pitch stiffness of said head suspension assembly is from about 0.2 Nm/deg to about 2 Nm/deg.

5. A magnetic disk drive according to claim 1, wherein a nominal diameter of said disk is about 1 inch or less.

6. A magnetic disk drive comprising:
   a magnetic disk having a track, whose linear velocity is from about 1 m/s to about 5 m/s at a rated rotational speed;
   a negative pressure type femto slider having a head which accesses said disk;
   a ramp where said slider is configured to be retracted; and
   a head suspension assembly which supports said slider;
   wherein a gram load "GL" (mN), a pitch static attitude "PSA" (deg) and a pitch stiffness "Kp" (Nm/deg) of said head suspension assembly satisfy the following expression:

$((PSA \times Kp)/GL) < 0.25$ mm.

7. A magnetic disk drive according to claim 6, wherein said pitch static attitude is from about 0 deg to about 3 deg.

8. A magnetic disk drive according to claim 7, wherein said pitch static attitude is from about 0.3 deg to about 2 deg.

9. A magnetic disk drive according to claim 8, wherein said pitch static attitude is from about 0.5 deg to about 1.8 deg.

10. A magnetic disk drive according to claim 6, wherein said pitch stiffness is from about 0.2 Nm/deg to about 2 Nm/deg.

11. A magnetic disk drive according to claim 6, wherein a nominal diameter of said disk is about 1 inch or less.

12. A magnetic disk drive comprising:
    a magnetic disk having a track, whose linear velocity is from about 1 m/s to about 5 m/s at a rated rotational speed;
    a negative pressure type femto slider having a head which accesses said disk;
    a ramp where said slider is configured to be retracted; and
    a head suspension assembly which supports said slider;
    wherein a gram load "GL" of said head suspension assembly is from about 3 mN to about 15 mN, and said "GL" (mN), a pitch static attitude "PSA" (deg) and a pitch stiffness "Kp" (Nm/deg) of said head suspension assembly satisfy the following expression:

$((PSA \times Kp)/GL) < 0.25$ mm.

13. A magnetic disk drive according to claim 12, wherein said gram load is from about 6 Nm to about 13 Nm.

14. A magnetic disk drive according to claim 13, wherein said gram load is from about 7 mN to about 12 mN.

15. A magnetic disk drive according to claim 12, wherein said pitch static attitude is from about 0 deg to about 3 deg.

16. A magnetic disk drive according to claim 15, wherein said pitch static attitude is from about 0.3 deg to about 2 deg.

17. A magnetic disk drive according to claim 16, wherein said pitch static attitude is from about 0.5 deg to about 1.8 deg.

18. A magnetic disk drive according to claim 12, wherein said pitch stiffness is from about 0.2 Nm/deg to about 2 Nm/deg.

19. A magnetic disk drive according to claim 12, wherein a nominal diameter of said disk is about 1 inch or less.

* * * * *